Nov. 19, 1963     J. A. LOFQUIST     3,111,227
STACKER CRANE
Filed May 10, 1961     5 Sheets-Sheet 1

INVENTOR.
JOHN A. LOFQUIST
BY Williams, David, Hoffmann & Jount
ATTORNEYS

INVENTOR.
JOHN A. LOFQUIST

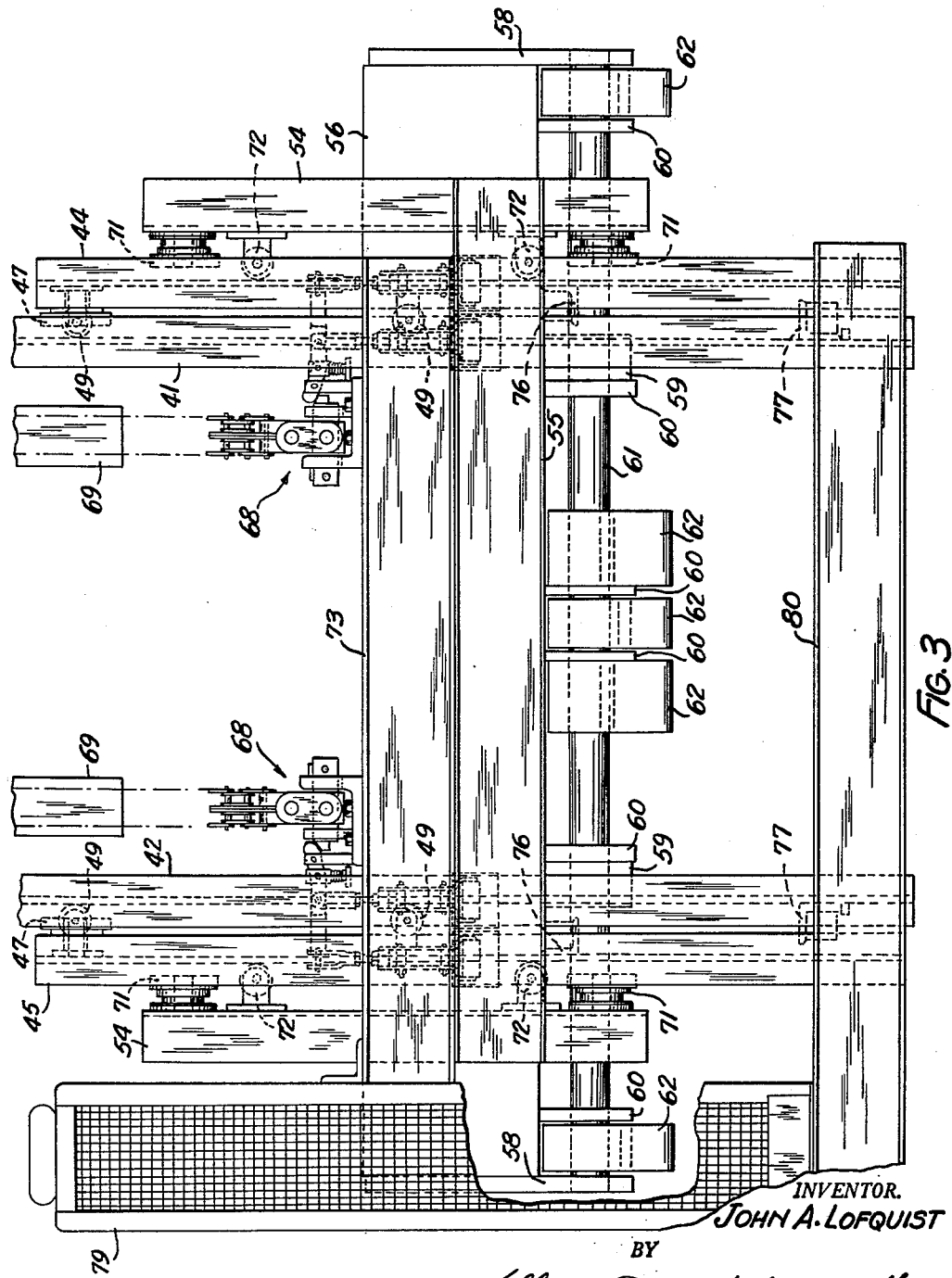

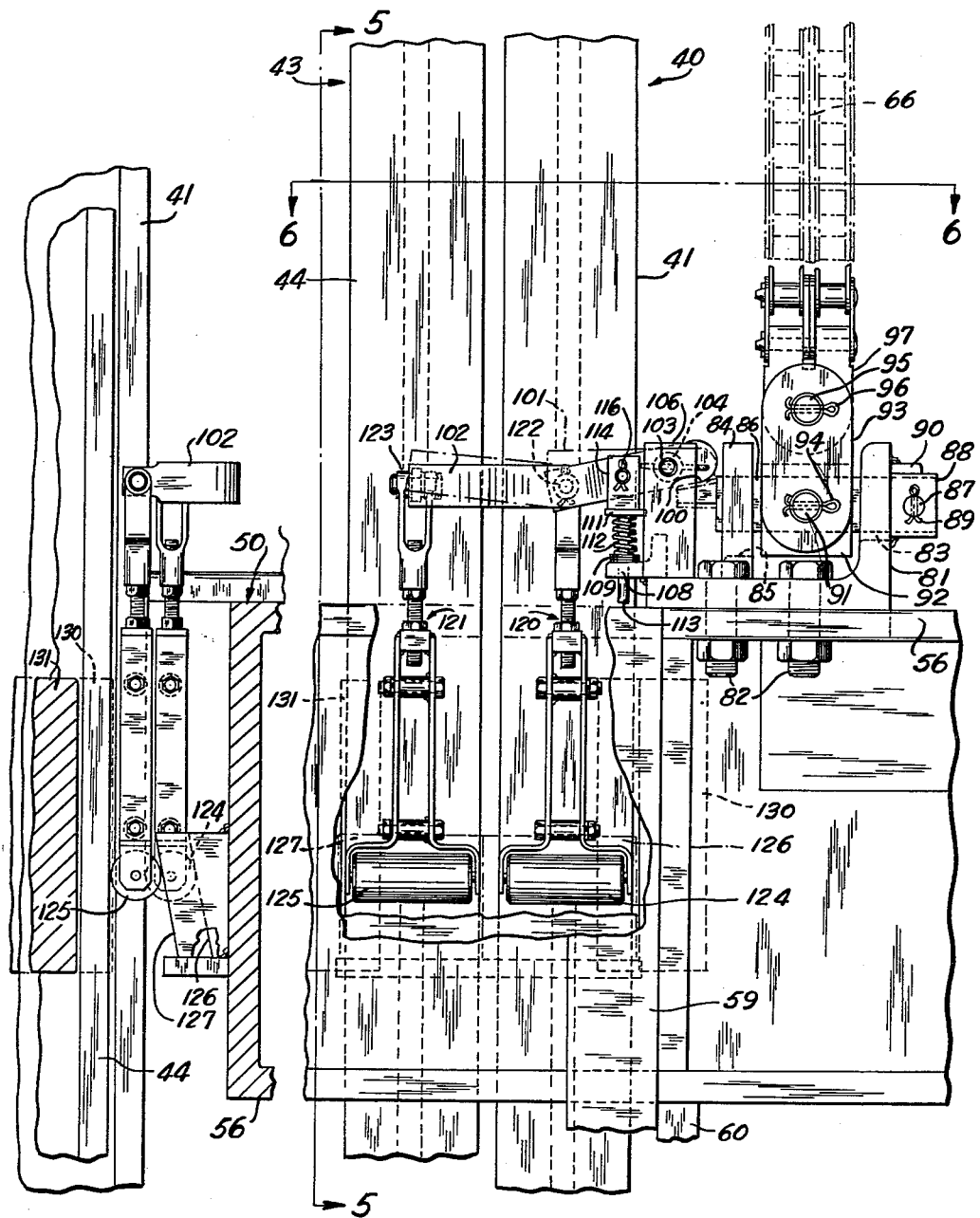

United States Patent Office 3,111,227
Patented Nov. 19, 1963

3,111,227
STACKER CRANE
John A. Lofquist, Eastlake, Ohio, assignor to The Cleveland Crane & Engineering Company, Wickliffe, Ohio, a corporation of Ohio
Filed May 10, 1961, Ser. No. 109,099
2 Claims. (Cl. 212—128)

The present invention relates to material handling devices and, more particularly, to material handling devices which have a support and a load carriage movable vertically with respect to the support.

The principal object of the present invention is the provision of a new and improved material handling device, of the above noted type, which insures safety to the operator and/or the material being handled in the event the material handling device is rendered ineffective.

Another principal object of the present invention is the provision of a new and improved material handling device having a load carriage and operator's cab movable vertically with respect to a support and a mechanism for wedging the load carriage and operator's cab to the support in the event the material handling device is rendered ineffective to thereby insure safety to the operator and/or the material being handled.

Another principal object of the present invention is the provision of a new and improved material handling apparatus having a support, a plurality of relatively movable mast sections, a first one of which is connected to the support, a load carriage, means for moving the load carriage, a second movable mast section, and an operator's cab relative to the first mast section and means responsive to the ineffectiveness of the moving means to prevent the carriage, second movable mast section, and operator's cab from falling in the event that the moving means breaks or is otherwise rendered ineffective, thereby avoiding damage to the material handling apparatus and material on the load carriage and injury to the operator.

A further object of the present invention is the provision of a new and improved material handling device having a support, a plurality of relatively movable mast sections, a first one of which is connected to the support, a load carriage, at least one flexible member connected to the load carriage for moving the load carriage and a second mast section relative to the first mast section, and means responsive to a breaking of the flexible member for securing the load carriage to the second mast section and to the first mast section, thus preventing the carriage and second mast section from falling in the event the flexible member breaks, thereby preventing damage to the apparatus and the material on the load carriage and injury to the operator who is preferably in an operator's cab attached to the second mast section.

Further objects and advantages of the present invention will be apparent to those skilled in the art to which it relates from the following description of the preferred embodiment made with reference to the accompanying drawings, forming a part of the specification, in which:

FIG. 3 is a rear view of the material handling apparatus of FIG. 1, showing the load carriage in an elevated position;

FIG. 4 is an enlarged elevational view with parts broken away of a portion of FIG. 1;

FIG. 5 is a view taken along the section line 5—5 of FIG. 4; and

Figure 1:
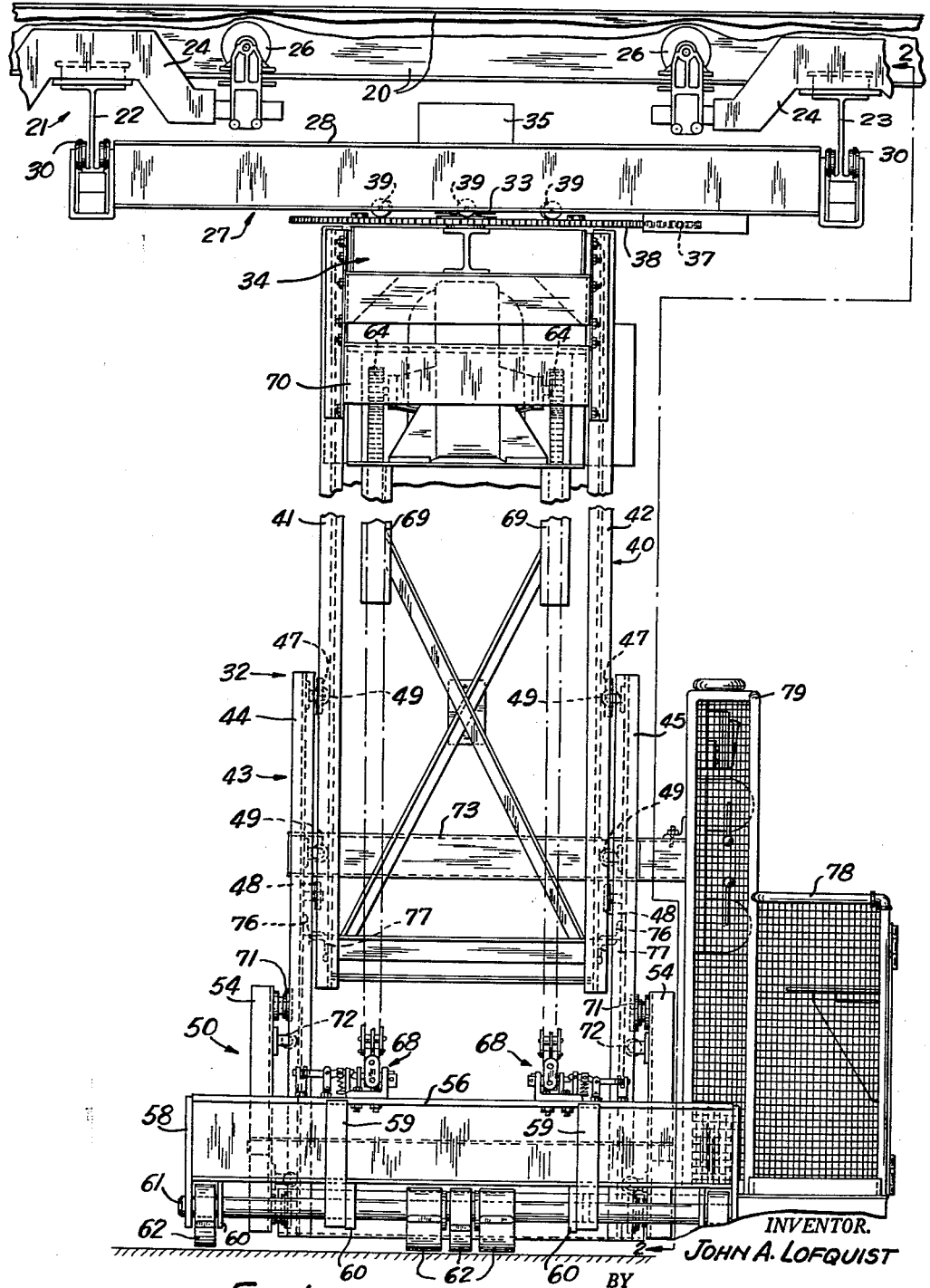
FIG. 1 is an elevational view of a material handling apparatus embodying the present invention.

Referring to the drawings, the present invention is shown as embodied in a traveling crane supported by spaced rails, one of which is shown at 20. The spaced rails form a runway for the crane and may be positioned at the edge of an area having rows of bins or shelves for storing articles to be handled by the crane.

The crane includes a bridge 21 which spans the distance between the spaced rails, which form the runway, and is movable along the runway. The bridge 21 comprises spaced rail beams 22 and 23 that extend transversely to the runway rails and end trucks 24 connected to opposite ends of the rail beams 22 and 23. The end trucks include wheels 26 which ride on the tread portions of the runway rails and support the crane for movement along the runway rails. A movable support, which in the preferred and illustrated embodiment is a trolley or carrier 27, extends between the spaced rail beams 22 and 23 of the bridge 21 and is movable along the rail beams 22 and 23. The carrier 27 includes a frame 28 and wheels 30 which support opposite ends of the frame 28 and which ride on the horizontal flange portions or treads of the rail beams 22 and 23. The carrier 27 is provided with a motor 31 for driving one set of the wheels 30 to move the carrier 27 along the rail beams 22 and 23.

A vertically extending revolvable mast assembly 32 is connected to the carrier 27 and is movable therewith. The mast assembly 32 is rotatably supported by the frame portion 28 of the carrier 27 by a trunnion pin assembly 33, one end of which is secured to the upper frame assembly 34 of the mast assembly 32 and the other end is secured to a support assembly 35 mounted between transverse members of the frame 28 of the carrier 27. The mast assembly is preferably rotated by a motor, not shown, which rotates a pinion gear 37 in mesh with a bull gear 38 which is suitably secured to the upper frame assembly 34. The frame of the carrier 27 is provided with a plurality of rollers 39 which engage the upper side of the upper frame assembly 34 of the revolvable mast assembly 32 to stabilize the mast assembly.

The revolvable assembly 32 includes a plurality of relatively movable mast sections. One of the mast sections, primary mast 40, is secured to and extends vertically from the upper frame assembly 34 and is formed by spaced vertical guide members 41, 42 constituting the sides of the primary mast. Another of the mast sections, secondary mast 43, is operatively connected to the primary mast 40 for vertical movement relative to the primary mast and is adapted to telescope over the primary mast 40. The secondary mast includes spaced vertical guide members 44, 45, disposed adjacent the opposite sides of the primary mast outwardly of the guide members 41, 42, respectively. Each of the guide members 44, 45 supports a pair of wheels 47, 48 which cooperate with the adjacent one of the guide members 41, 42 to guide the movement of the secondary mast 43 with respect to the primary mast 40. The wheels 47, 48 engage the opposite flanges of the guide members 41, 42. This engagement can best be seen in FIG. 6. The vertical spacing of the wheels 47, 48 prevents rocking movement of the secondary mast assembly about a horizontal axis when the latter is extended to form an extension of the primary mast. In addition to the wheels 47, 48 to guide the movement of the secondary mast 43 with respect to the primary mast 40, the secondary mast is provided with rollers 49 to engage the web portion of the guide members 41, 42 which connect the flanges of the guide members 41, 42 of the primary mast 40.

The mast assembly 32 functions as a support for a vertically movable load carriage 50 and guides the load carriage 50 in its vertical movement. The load carriage 50 comprises a pair of channel members 54, one of which is spaced outwardly of each of the guide members 44, 45 of the secondary mast. The spaced channel members 54 are connected together by abutment of channel member 55 and channel member 56, both of which extend transversely of the primary and secondary masts. Channel member 55 is preferably secured to the spaced channel members 54 by a pair of blocks 57, one of which is welded to each channel member 54 and to one end of the channel 55. Channel 56 is preferably welded directly to the spaced channel members 54. End plates 58, brackets 59, and stops 60 are secured to the channel 56 and project below channel 56. A shaft 61 extends below the channel 56 and parallel to the channel 56 through aligned apertures in the end plates 58, brackets 59, and stops 60.

Figure 2:
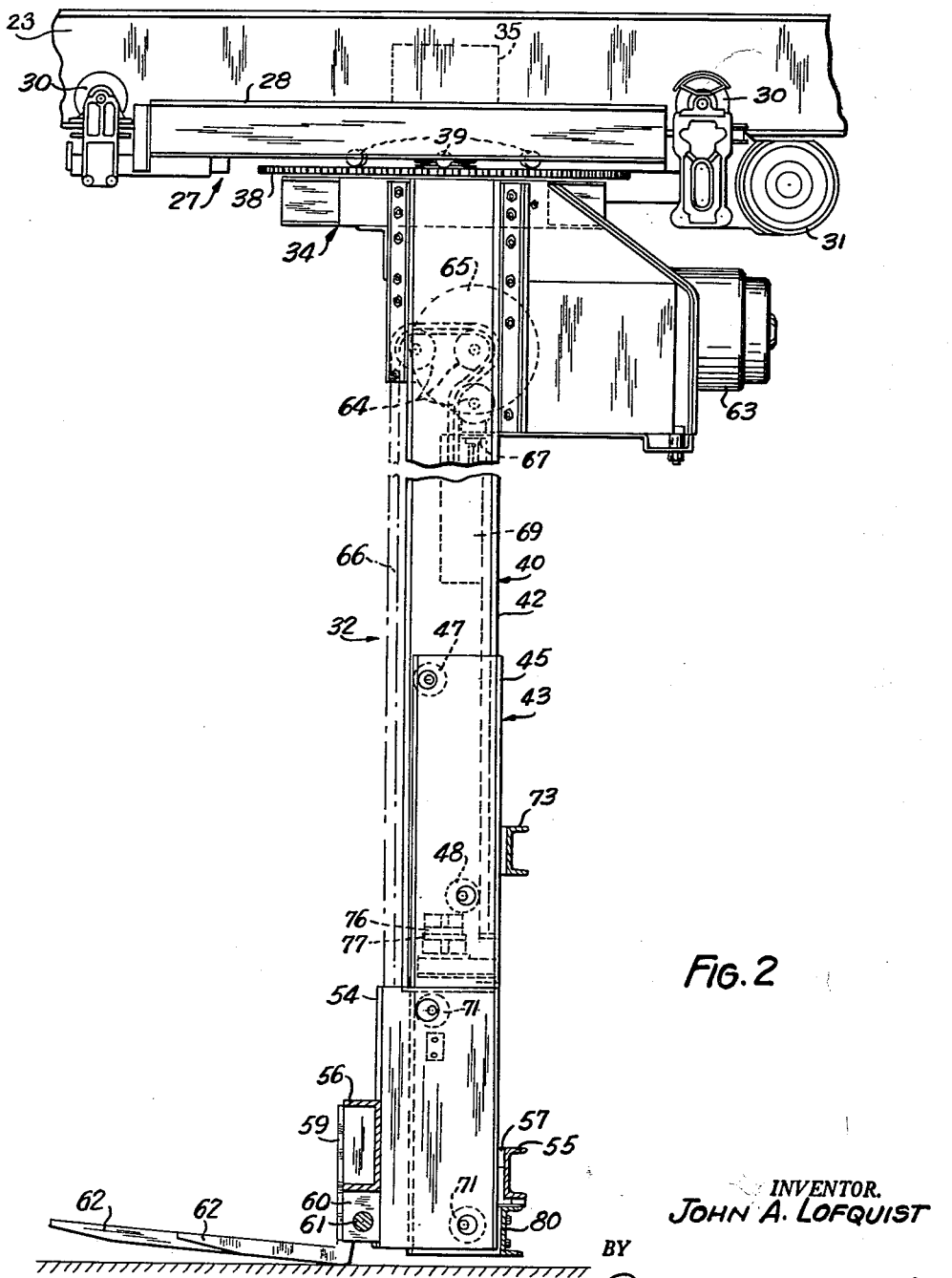
FIG. 2 is a view taken along the section line 2—2 of FIG. 1 with certain parts removed.

The vertically movable carriage 50 carries load engaging mechanism which engages the material being handled to move the material as desired. This load engaging mechanism may be of any suitable nature dictated by the type of material being handled, for example, a grab, bucket, or hook. The load engaging mechanism shown in the drawings includes a plurality of fork members 62, some of which are shorter than others as can be seen in FIG. 2, pivotally mounted on shaft 61, so that certain fork members which are not being used may be pivoted vertically out of operative position. The fork members 62 are adjustable and may be slid on shaft 61 between adjacent stops toward and away from each other to vary the spacing between the fork members. It is apparent that the fork members at the ends of the shaft 61, being in snug engagement with the sides of end plates 58 and adjacent stops 60 cannot be slid on shaft 61, which is true also of the center fork member. Also, it is to be understood that any desired number of fork members may be mounted on the shaft 61.

The load carriage 50 and the load engaging mechanism, fork members 62, connected thereto are raised and lowered by motor 63 connected to the upper frame assembly 34 and the upper end of primary mast 40. The motor 63 drives certain of a plurality of sprockets 64, supported in the upper end of the primary mast 40, through suitable gearing 65. The carriage 50 is suspended from the primary mast 40 by flexible members or chains 66 trained over the plurality of sprockets 64 and connected at their lower ends to the load carriage 50 by mechanism 68, which is described in detail below. The other ends of the chains 66 are secured to brackets 67 which are welded to the primary mast 40. Rotation of the motor 63 will rotate sprockets 64 and will either raise or lower the load carriage 50, depending upon the direction of the rotation of the motor 63. When the motor 63 is operated to raise the load carriage 50 the flexible members or chains 66 form loops between the guide channels 41, 42 of the primary mast. Suitable boxes or guides 69 are utilized to contain and guide the chain loops between the guide channels 41, 42. A chain guard 70 is secured to the upper end of the mast assembly to keep foreign matter from becoming fouled in the chains 66.

The load carriage 50 is guided in its vertical movement relative to the mast assembbly 32 by a plurality of rollers mounted on the load carriage which cooperate with the vertical guide members 44, 45 of the secondary mast 43. These rollers comprise spaced wheels 71 supported by channel members 54 of the carriage which engage the flanges of the guide members 44, 45 of the secondary mast 43, and rollers 72 also supported by the channel members 54 of the carriage which engage the web portion of guide members 44, 45 which connect the flanges of the guide members.

The load carriage 50 and the secondary mast 43 are preferably so constructed that during the raising of the load carriage 50 from its lowermost position the load carriage moves relative to the secondary mast 43, then the load carriage and secondary mast move together. As the load carriage 50 is elevated from its lowermost position by the flexible members or chains 66 the load carriage will move relative to the secondary mast 43 until the beam 55 on the load carriage contacts an abutment or beam 73, as shown in FIG. 3, which is secured to the secondary mast. Further raising of the load carriage will cause the beam 55 on the load carriage 50 to raise beam 73 on the secondary mast, and this causes the secondary mast 43 to be raised along with the load carriage. Other structural arrangements obviously could be utilized to cause the raising of the load carriage and secondary mast. These other arrangements may or may not permit the relative movement between the load carriage and secondary mast discussed above.

The construction of the load carriage 50 and secondary mast 43 is such that during the lowering of the load carriage, the load carriage and secondary mast move as a unit and then the load carriage moves relative to the secondary mast. As the load carriage 50 and secondary mast 43 lower as a unit relative to the primary mast 40, a member 76, which is secured to each of the guide members 44, 45 of the secondary mast 43, approaches a similar member 77, which is secured to each of the guide members 41, 42 of the primary mast. The secondary mast 43 and load carriage 50 continue to lower as a unit until members 76 engage members 77. As a result of this engagement the secondary mast 43 can be lowered no further. Further lowering movement of the chains 66 causes the load carriage 50 to move lower relative to the secondary mast 43.

The load carriage and secondary mast as well as the other elements of the traveling crane shown are controlled by an operator who rides in an operator's cab 78 and manipulates controls which are located on a control panel 79. As the secondary mast is raised and lowered the operator's cab 78 will also be raised and lowered. This is because the operator's cab 78 and control panel 79 are secured to beam 73 and beam 80 which is parallel to beam 73, both of which are secured to the secondary mast 43.

The pair of chains 66 which move the carriage 50 are secured to the carriage by mechanisms 68. The mechanisms 68 are identical, and therefore only the left hand mechanism 68 as viewed in FIG. 1 will be described in detail.

The mechanism 68 shown in FIG. 4 includes an L-shaped bracket 81 secured to the beam 56 of the carriage 50 by suitable securing means such as bolts 82. A leg of the bracket 81 which extends vertically has an aperture 83 therein. The other leg of the bracket 81 which extends horizontally and which is bolted to the beam 56 has a vertically extending plate 84 welded thereto. The plate 84 has an aperture 85 which is in alignment with the aperture 83 in the vertically extending leg of the bracket 81. A bar 86 extends through the apertures 83 and 85, which are elongated vertically, and is pivotally mounted on a pin 87 which extends between two parallel plates 88 which are welded to the vertically extending leg of the bracket 81. The pin 87 is secured in the plates 88 by suitable means such as cotter pins 89. Also secured to the vertically extending leg of the bracket 81 is a horizontally extending plate 90 which ties the two plates 88 together thereby adding strength to the structure.

The chain 66 is connected to bar 86. This connection includes a pin 91 which extends through a horizontally extending aperture in the bar 86. A trunnion block 92 is rotatably mounted on the pin 91. One end of each of a pair of chain connecting links 93 is mounted on pin 91 on opposite sides of the trunnion block 92. The connecting links 93 and trunnion block 92 are held on the pin 91 by suitable means such as a pair of cotter pins 94, only one of which can be seen on the drawings. The other ends of the connecting links 93 are held on pin 95 by means of cotter pins 96. Rotatably mounted on pin 95 and interposed between the chain connecting links 93 is a chain anchor 97. The end of the anchor 97 opposite the end which is rotatably mounted on the pin 95 is secured to the chain 66 which raises and lowers the carriage.

Thus it can be seen that when the chain 66 is taut, connecting links 93 pull bar 86 against the top surfaces of apertures 83 and 85, and thus the chain is effective to raise, hold, or lower the load carriage. It is also apparent that if for any reason slack would be created in the chain 66 the bar 86 would pivot about pin 87 and lower away from the upper edges of the slots 83 and 85, thus rendering the flexible members or chains ineffective to raise, hold, or lower the load carriage.

A lug 100 is mounted on the end of the bar 86 opposite the end which is pivoted about pin 87. The ends of levers 101 and 102 rest on the lug 100. Levers 101, 102 are pivotally mounted on pin 103 which extends through sleeve 104 positioned between spaced vertical plates 105 and 106. The pin 103 is inserted in the plate 105 and is held in position by cotter pin 107 which extends through an aperture in the plate 106 and an aperture in the pin 103.

An L-shaped bracket 108 is welded to the horizontal leg of the bracket 81 which is secured to the beam 56 of the load carriage 50. The horizontal leg of the bracket 108 extends beyond the horizontal leg of the bracket 81 and provides a ledge on which a bearing washer 109 is positioned directly beneath each of the levers 101, 102. Interposed between each bearing washer 109 and a bearing plate 111 are springs 112, only one of which can be seen in the drawings, encircling spring guide rods 113 which extend from the bracket 108 to bearing plates 111. Welded to each of the bearing plates 111 are two pairs of vertical plates 114, 115. The pairs of vertical plates 114 and 115 have aligned apertures therein and headed rods 116 and 117, respectively, are inserted through the openings in the pairs of plates and through openings in the levers 101 and 102, respectively. The rods 116, 117 are held in position by cotter pins. The ends of levers 101 and 102 opposite the ends which rest on the lug 100 have vertically extending connecting rods 120 and 121 secured to them by suitable securing means 122 and 123. The connecting rods 120 and 121 carry rollers 124 and 125, respectively. It is apparent, then, that if slack is created in the chain 66, the lug 100 is lowered, and springs 112 force bearing plates 111 upwardly, thereby pivoting levers 101, 102 about pin 103. This pivoting movement will raise rollers 124 and 125.

Figure 6:
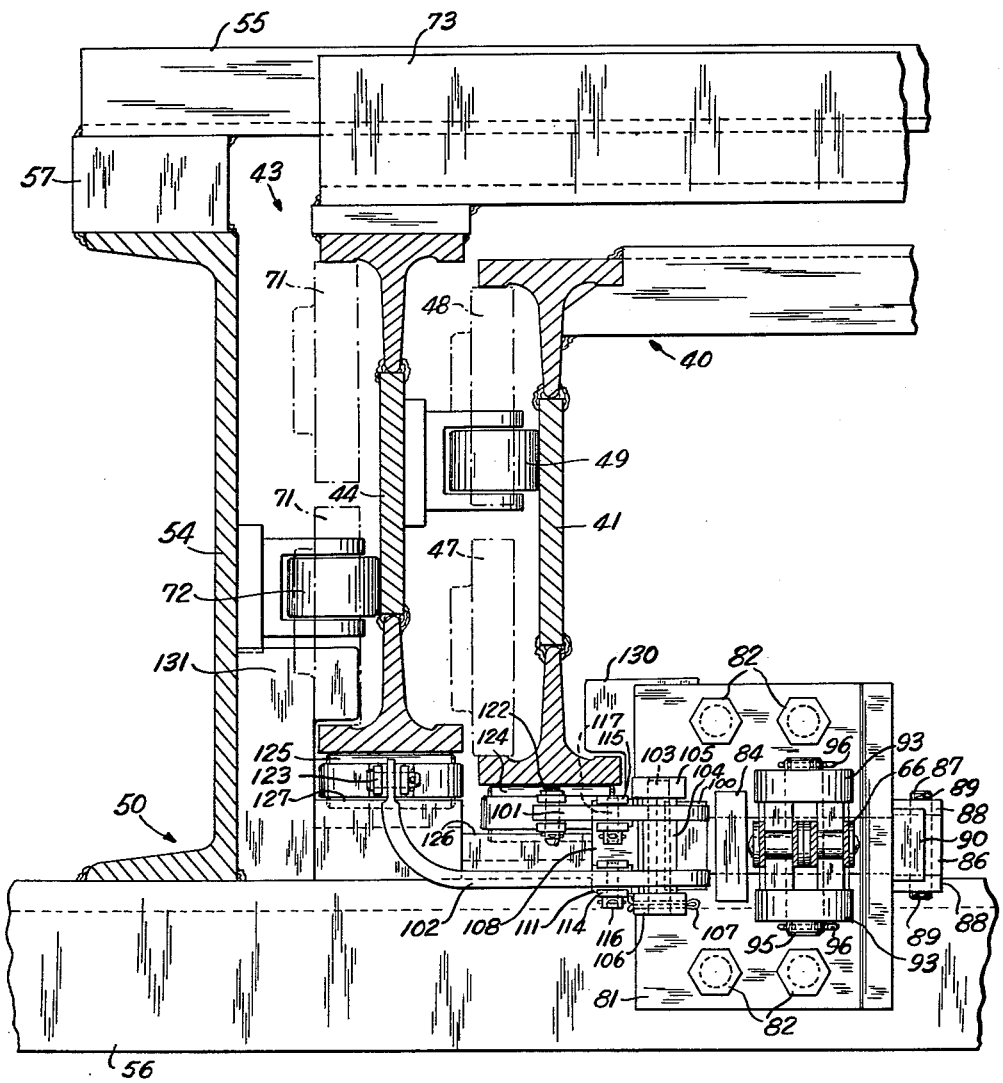
FIG. 6 is a view taken along the section line 6—6 of FIG. 4.

The rollers 124, 125 in their raised position function as a wedging mechanism to secure the load carriage 50 to the primary mast 40 and to the secondary mast 43. The rollers 124, 125 wedge between certain inclined surfaces on the load carriage and the flanges of the guide members on the mast sections. The inclined surfaces on the load carriage comprise surfaces 126 and 127 which are welded to the beam 56 of the load carriage 50. As can be seen in FIG. 6, the levers 101, 102 are shaped to position the rolls 124, 125 between the inclined surfaces 126, 127, and flanges of the guide members 41 and 44 of the primary and secondary mast sections, respectively. Thus, when the rollers 124, 125 are raised by the springs 112, the rollers wedge between the inclined surfaces 126, 127 and the flange portions of the guide members 41 and 44 of the secondary and primary masts, respectively. This wedging action secures the load carriage 50 to the primary mast 40 through roller 124 wedged between the inclined surface 126 and the flange of the guide member 41 of the primary mast, and also secures the load carriage 50 to the secondary mast 43 through roller 125 wedged between inclined surface 127 and the flange of the guide member 44 of the secondary mast.

In order to insure a tight wedging action of the rollers between the flange portions and inclined surfaces, hook-like members 130 and 131 are welded to the beam 56 of the load carriage 32 with the hooks in position to engage the sides of the flanges of the respective guide members 41 and 44 of the primary and secondary masts opposite the side of the flanges which are engaged by the rollers 124 and 125. Thus, these hook-like members 130, 131 absorb the high stresses created by the wedging action of the rolls 124 and 125 against the flanges of the guide members 41 and 44, respectively, and limit movement of the guide members 41 and 44 in a direction transverse to the beam 56. Thus, these hook-like members insure a tight wedging engagement of the rollers between the flanges of the respective guide members and the inclined surfaces.

While the operation of the disclosed crane should be clear, it should be noted that the roller 125 will always wedge the carriage 50 to the telescoping mast 43 if the chain 66 would break or otherwise become ineffective. The roller 124 may or may not wedge the carriage 50 to the primary mast 40. Whether or not the roll 124 wedges the carriage 50 to the primary mast 40 depends upon the vertical position of the carriage at the time the chain becomes ineffective. For example, if the chain breaks after the members 76, 77 on the telescoping mast and primary mast, respectively, have engaged, the load carriage would have passed beyond the primary mast and therefore roller 124 could not wedge against the primary mast. In such an event the secondary mast 43 and operator's cab 78 which is connected thereto could not fall because the operator's cab and secondary mast would be in their lowermost position, resting upon members 77, which are secured to the primary mast 40. Should the secondary mast be in a position between its topmost and lowermost positions or be moving as a unit with the load carriage 50 when the chain 66 becomes ineffective, roller 124 would engage the primary mast 41 and secure the load carriage 50 to the primary mast 41, and roller 125 would secure the load carriage 50 to the secondary mast 43.

While the applicant's invention as shown and described in this specification is embodied in a power actuated crane, it will be understood by those skilled in the art that the applicant's invention may be constructed so that certain of the powered operations are performed manually. For example, the hoist motor 63 for elevating the load carriage 50 and the secondary mast 43 may be replaced by a manually operable hoist, if such is deemed desirable.

It is also understood that although the applicant's invention has been described and shown embodied in an overhead traveling crane having a revolvable mast section 33 that such structure is not necessary to the proper functioning of applicant's invention and that the invention could be embodied in material handling devices not having the specific structure described.

While a preferred form of the invention has been described in considerable detail, it will be apparent that the invention is not limited to the construction shown or the uses referred to and it is my intention to cover all adaptations, modifications, and changes which come within the practice of those skilled in the art to which the invention relates and the scope of the appended claims.

Having thus described my invention, I claim:

1. A device of the character described comprising, a movable overhead support, a first mast section supported by said overhead support and extending downwardly therefrom, a second mast section movable vertically relative to said first mast section, load carriage means movable vertically relative to said first and second mast sections, power means for effecting movement of said load carriage means and said second mast section vertically relative to said first mast section, and means for securing said load carriage means to said first mast section and to said second mast section in response to the ineffectiveness of said power means to thereby prevent vertical movement of said load carriage means in the event said power means becomes ineffective.

2. A device of the class described comprising: a movable overhead support, a first mast section secured to said overhead support and extending downwardly therefrom, a second mast section operatively connected to said first mast section for vertical movement relative thereto, load carriage means operatively associated with said first and second mast sections and movable vertically relative thereto, flexible means operatively connected to said load carriage means for moving said load carriage means vertically relative to said first and second mast sections, wedging members supported by and movable with said load carriage means and having an operable position securing said load carriage means to said first and second mast sections and an inoperable position permitting movement of said load carriage means relative to said second mast section and movement of said second mast section relative to said first mast section, spring means biasing said wedging members to their said operable position, a member supported by said load carriage means and movable between a first position holding said wedging members in said inoperable position against the bias of said spring means and a second position providing for movement of said wedging members to their said operable position by said spring means, and means attaching said movable member to said flexible means and effective upon tension on said flexible means to hold said member in its said first position and said wedging members in their said inoperative positions.

References Cited in the file of this patent
UNITED STATES PATENTS

| | | |
|---|---|---|
| 2,897,920 | Falter et al. | Aug. 4, 1959 |
| 2,947,426 | Cotesworth et al. | Aug. 2, 1960 |
| 3,016,973 | Williamson | Jan. 16, 1962 |